US011378332B2

(12) United States Patent
Valencia et al.

(10) Patent No.: US 11,378,332 B2
(45) Date of Patent: Jul. 5, 2022

(54) MIXING AND HEAT INTEGRATION OF MELT TRAY LIQUIDS IN A CRYOGENIC DISTILLATION TOWER

(71) Applicant: EXXONMOBIL UPSTREAM RESEARCH COMPANY, Spring, TX (US)

(72) Inventors: Jaime A. Valencia, Houston, TX (US); Charles J. Mart, The Woodlands, TX (US); Ransdall K. Smith, Spring, TX (US); David W. Maher, Spring, TX (US)

(73) Assignee: EXXONMOBIL UPSTREAM RESEARCH COMPANY, Spring, TX (US)

( * ) Notice: Subject to any disclaimer, the term of this patent is extended or adjusted under 35 U.S.C. 154(b) by 518 days.

(21) Appl. No.: 16/440,030

(22) Filed: Jun. 13, 2019

(65) Prior Publication Data

US 2020/0003490 A1   Jan. 2, 2020

Related U.S. Application Data

(60) Provisional application No. 62/691,679, filed on Jun. 29, 2018.

(51) Int. Cl.
*F25J 3/02* (2006.01)
*C10G 31/06* (2006.01)
*C10L 3/10* (2006.01)

(52) U.S. Cl.
CPC ............ *F25J 3/0209* (2013.01); *C10G 31/06* (2013.01); *C10L 3/103* (2013.01); *C10L 3/104* (2013.01);
(Continued)

(58) Field of Classification Search
CPC ...... F25J 3/0209; F25J 3/0266; F25J 2200/02; F25J 2200/94; F25J 2205/20;
(Continued)

(56) References Cited

U.S. PATENT DOCUMENTS 2,621,216 A   12/1952 White
2,843,219 A   7/1958 Habgood
(Continued)

FOREIGN PATENT DOCUMENTS

DE   3 149847   7/1983
EP   0 133 208   2/1985
(Continued)

OTHER PUBLICATIONS

Aaron, D. et al. (2005) "Separation of $CO_2$ from Flue Gas: A Review," *Separation Science and Technology*, 40, pp. 321-348.
(Continued)

*Primary Examiner* — Brian A McCaig
(74) *Attorney, Agent, or Firm* — Vorys, Sater, Seymour and Pease LLP

(57) ABSTRACT

A cryogenic distillation tower for separating a feed stream. The tower includes a distillation section. A controlled freeze zone section is situated above the distillation section and forms a solid from the feed stream. The controlled freeze zone section includes a spray assembly in an upper section and a melt tray assembly in a lower section. The melt tray assembly includes at least one vapor stream riser that directs the vapor from the distillation section into liquid retained by the melt tray assembly, and one or more draw-off openings positioned to permit a portion of the liquid to exit the controlled freeze zone section. The portion of the liquid indirectly exchanges heat with a heating fluid. One or more return inlets return the portion of the liquid to the melt tray assembly after it has been heated in the heat exchanger.

18 Claims, 6 Drawing Sheets

(52) U.S. Cl.
CPC .... *F25J 3/0266* (2013.01); *C10G 2300/1025* (2013.01); *C10G 2300/1081* (2013.01); *C10G 2300/207* (2013.01); *C10L 2290/543* (2013.01); *F25J 2200/02* (2013.01); *F25J 2200/94* (2013.01); *F25J 2205/20* (2013.01); *F25J 2210/60* (2013.01); *F25J 2215/60* (2013.01); *F25J 2215/62* (2013.01); *F25J 2220/66* (2013.01); *F25J 2280/40* (2013.01)

(58) Field of Classification Search
CPC .. F25J 2210/60; F25J 2215/60; F25J 2215/62; F25J 2220/66; F25J 2280/40; C10G 31/06; C10G 2300/1025; C10G 2300/1081; C10G 2300/207; C10L 3/103; C10L 3/104; C10L 2290/643; B01D 1/16; B01D 3/166; B01D 3/20
See application file for complete search history.

(56) References Cited

U.S. PATENT DOCUMENTS

| | | |
|---|---|---|
| 2,863,527 A | 12/1958 | Herbert |
| 2,960,837 A | 11/1960 | Swenson et al. |
| 3,050,950 A | 8/1962 | Karwat et al. |
| 3,109,726 A | 11/1963 | Karwat |
| 3,349,571 A | 10/1967 | Nebgen |
| 3,393,527 A | 7/1968 | Swensen et al. |
| 3,400,512 A | 9/1968 | McKay |
| 3,421,984 A | 1/1969 | Jensen et al. |
| 3,683,634 A | 8/1972 | Streich |
| 3,705,625 A | 12/1972 | Whitten et al. |
| 3,767,766 A | 10/1973 | Tjoa et al. |
| 3,824,080 A | 7/1974 | Smith et al. |
| 3,842,615 A | 10/1974 | Reigel et al. |
| 3,848,427 A | 11/1974 | Loofbourow |
| 3,895,101 A | 7/1975 | Tsuruta |
| 3,929,635 A | 12/1975 | Buriks et al. |
| 3,933,001 A | 1/1976 | Muska |
| 4,129,626 A | 12/1978 | Mellbom |
| 4,246,015 A | 1/1981 | Styring |
| 4,270,937 A | 6/1981 | Adler |
| 4,280,559 A | 7/1981 | Best |
| 4,281,518 A | 8/1981 | Muller et al. |
| 4,318,723 A | 3/1982 | Holmes et al. |
| 4,319,964 A | 3/1982 | Katz et al. |
| 4,336,233 A | 6/1982 | Appl et al. |
| 4,344,485 A | 8/1982 | Butler |
| 4,370,156 A | 1/1983 | Goddin et al. |
| 4,382,912 A | 5/1983 | Madgavkar et al. |
| 4,383,841 A | 5/1983 | Ryan et al. |
| 4,405,585 A | 9/1983 | Sartori et al. |
| 4,417,449 A | 11/1983 | Hegarty et al. |
| 4,417,909 A | 11/1983 | Weltmer |
| 4,421,535 A | 12/1983 | Mehra |
| 4,441,900 A | 4/1984 | Swallow |
| 4,459,142 A | 7/1984 | Goddin |
| 4,462,814 A | 7/1984 | Holmes et al. |
| 4,466,946 A | 8/1984 | Goddin et al. |
| 4,511,382 A | 4/1985 | Valencia et al. |
| 4,512,782 A | 4/1985 | Bauer et al. |
| 4,533,372 A | 8/1985 | Valencia et al. |
| 4,551,158 A | 11/1985 | Wagner et al. |
| 4,563,202 A | 1/1986 | Yao et al. |
| 4,592,766 A | 6/1986 | Kumman et al. |
| 4,602,477 A | 7/1986 | Lucadamo |
| 4,609,388 A | 9/1986 | Adler et al. |
| 4,636,334 A | 1/1987 | Skinner et al. |
| 4,695,672 A | 9/1987 | Bunting |
| 4,697,642 A | 10/1987 | Vogel |
| 4,710,213 A | 12/1987 | Sapper et al. |
| 4,717,408 A | 1/1988 | Hopewell |
| 4,720,294 A | 1/1988 | Lucadamo et al. |
| 4,747,858 A | 5/1988 | Gottier |
| 4,761,167 A | 8/1988 | Nicholas et al. |
| 4,762,543 A | 8/1988 | Pantermuehl et al. |
| 4,769,054 A | 9/1988 | Steigman |
| 4,822,393 A | 4/1989 | Markbreiter et al. |
| 4,831,206 A | 5/1989 | Zarchy |
| 4,923,493 A | 5/1990 | Valencia et al. |
| 4,927,498 A | 5/1990 | Rushmere |
| 4,935,043 A | 6/1990 | Blanc et al. |
| 4,954,220 A | 9/1990 | Rushmere |
| 4,972,676 A | 11/1990 | Sakai |
| 4,976,849 A | 12/1990 | Soldati |
| 5,011,521 A | 4/1991 | Gottier |
| 5,062,270 A | 11/1991 | Haut et al. |
| 5,120,338 A | 6/1992 | Potts et al. |
| 5,137,550 A | 8/1992 | Hegarty et al. |
| 5,152,927 A | 10/1992 | Rivers |
| 5,233,837 A | 8/1993 | Callahan |
| 5,240,472 A | 8/1993 | Sircar |
| 5,247,087 A | 9/1993 | Rivers |
| 5,265,428 A | 11/1993 | Valencia et al. |
| 5,335,504 A | 8/1994 | Durr et al. |
| 5,345,771 A | 9/1994 | Dinsmore |
| 5,567,396 A | 10/1996 | Perry et al. |
| 5,620,144 A | 4/1997 | Strock et al. |
| 5,643,460 A | 7/1997 | Marble et al. |
| 5,700,311 A | 12/1997 | Spencer |
| 5,720,929 A | 2/1998 | Minkkinen et al. |
| 5,819,555 A | 10/1998 | Engdahl |
| 5,820,837 A | 10/1998 | Marjanovich et al. |
| 5,899,274 A | 5/1999 | Frauenfeld et al. |
| 5,956,971 A | 9/1999 | Cole et al. |
| 5,964,985 A | 10/1999 | Wootten |
| 5,983,663 A | 11/1999 | Sterner |
| 6,053,007 A | 4/2000 | Victory et al. |
| 6,053,484 A | 4/2000 | Fan et al. |
| 6,082,133 A | 7/2000 | Barclay et al. |
| 6,082,373 A | 7/2000 | Sakurai et al. |
| 6,162,262 A | 12/2000 | Minkkinen et al. |
| 6,223,557 B1 | 5/2001 | Cole |
| 6,240,744 B1 | 6/2001 | Agrawal et al. |
| 6,267,358 B1 | 7/2001 | Gohara et al. |
| 6,270,557 B1 | 8/2001 | Millet et al. |
| 6,274,112 B1 | 8/2001 | Moffett et al. |
| 6,336,334 B1 | 1/2002 | Minkkinen et al. |
| 6,374,634 B2 | 4/2002 | Gallarda et al. |
| 6,401,486 B1 | 6/2002 | Lee et al. |
| 6,416,729 B1 | 7/2002 | DeBerry et al. |
| 6,442,969 B1 | 9/2002 | Rojey et al. |
| 6,500,982 B1 | 12/2002 | Hale et al. |
| 6,505,683 B2 | 1/2003 | Minkkinen et al. |
| 6,516,631 B1 | 2/2003 | Trebble |
| 6,517,801 B2 | 2/2003 | Watson et al. |
| 6,539,747 B2 | 4/2003 | Minta et al. |
| 6,565,629 B1 | 5/2003 | Hayashida et al. |
| 6,605,138 B2 | 8/2003 | Frondorf |
| 6,631,626 B1 | 10/2003 | Hahn |
| 6,632,266 B2 | 10/2003 | Thomas et al. |
| 6,662,872 B2 | 12/2003 | Gutek et al. |
| 6,708,759 B2 | 3/2004 | Leaute et al. |
| 6,711,914 B2 | 3/2004 | Lecomte |
| 6,735,979 B2 | 5/2004 | Lecomte et al. |
| 6,755,251 B2 | 6/2004 | Thomas et al. |
| 6,755,965 B2 | 6/2004 | Pironti et al. |
| 6,818,194 B2 | 11/2004 | DeBerry et al. |
| 6,883,327 B2 | 4/2005 | Iijima et al. |
| 6,946,017 B2 | 9/2005 | Leppin et al. |
| 6,958,111 B2 | 10/2005 | Rust et al. |
| 6,962,061 B2 | 11/2005 | Wilding et al. |
| 7,001,490 B2 | 2/2006 | Wostbrock et al. |
| 7,004,985 B2 | 2/2006 | Wallace et al. |
| 7,066,986 B2 | 6/2006 | Haben et al. |
| 7,073,348 B2 | 7/2006 | Clodic et al. |
| 7,121,115 B2 | 10/2006 | Lemaire et al. |
| 7,128,150 B2 | 10/2006 | Thomas et al. |
| 7,128,276 B2 | 10/2006 | Nilsen et al. |
| 7,152,431 B2 | 12/2006 | Amin et al. |
| 7,211,128 B2 | 5/2007 | Thomas et al. |
| 7,211,701 B2 | 5/2007 | Muller et al. |
| 7,219,512 B1 | 5/2007 | Wilding et al. |
| 7,285,225 B2 | 10/2007 | Copeland et al. |

(56) References Cited

U.S. PATENT DOCUMENTS

| | | |
|---|---|---|
| 7,325,415 B2 | 2/2008 | Amin et al. |
| 7,424,808 B2 | 9/2008 | Mak |
| 7,437,889 B2 | 10/2008 | Roberts et al. |
| 7,442,231 B2 | 10/2008 | Landrum |
| 7,442,233 B2 | 10/2008 | Mitariten |
| 7,493,779 B2 | 2/2009 | Amin |
| 7,536,873 B2 | 5/2009 | Nohlen |
| 7,550,064 B2 | 6/2009 | Bassler et al. |
| 7,575,624 B2 | 8/2009 | Cartwright et al. |
| 7,597,746 B2 | 10/2009 | Mak et al. |
| 7,635,408 B2 | 12/2009 | Mak et al. |
| 7,637,984 B2 | 12/2009 | Adamopoulos |
| 7,637,987 B2 | 12/2009 | Mak |
| 7,641,717 B2 | 1/2010 | Gal |
| 7,662,215 B2 | 2/2010 | Sparling et al. |
| 7,691,239 B2 | 4/2010 | Kister et al. |
| 7,722,289 B2 | 5/2010 | Leone et al. |
| 7,729,976 B2 | 6/2010 | Hill et al. |
| 7,770,872 B2 | 8/2010 | Delatour |
| 7,795,483 B2 | 9/2010 | Kulprathipanja et al. |
| 7,806,965 B2 | 10/2010 | Stinson |
| 7,814,975 B2 | 10/2010 | Hagen et al. |
| 7,879,135 B2 | 2/2011 | Ravikumar et al. |
| 7,901,583 B2 | 3/2011 | McColl et al. |
| 7,955,496 B2 | 6/2011 | Iqbal et al. |
| 8,002,498 B2 | 8/2011 | Leone et al. |
| 8,020,408 B2 | 9/2011 | Howard et al. |
| 8,133,764 B2 | 3/2012 | Dirks et al. |
| 8,136,799 B2 | 3/2012 | Griepsma |
| 8,303,685 B2 | 11/2012 | Schubert et al. |
| 8,308,849 B2 | 11/2012 | Gal |
| 8,312,738 B2 | 11/2012 | Singh et al. |
| 8,372,169 B2 | 2/2013 | Tsangaris et al. |
| 8,381,544 B2 | 2/2013 | Coyle |
| 8,388,832 B2 | 3/2013 | Moffett et al. |
| 8,428,835 B2 | 4/2013 | Habert et al. |
| 8,475,572 B2 | 7/2013 | Prast et al. |
| 8,500,105 B2 | 8/2013 | Nieuwoudt |
| 8,529,662 B2 | 9/2013 | Kelley et al. |
| 9,739,529 B2 | 8/2017 | Northrop et al. |
| 10,201,765 B2 | 2/2019 | Alzner et al. |
| 2002/0174687 A1 | 11/2002 | Cai |
| 2002/0189443 A1 | 12/2002 | McGuire |
| 2003/0181772 A1 | 9/2003 | Meyer et al. |
| 2006/0207946 A1 | 9/2006 | McColl et al. |
| 2006/0239879 A1 | 10/2006 | Lallemand et al. |
| 2007/0056317 A1 | 3/2007 | Amin et al. |
| 2007/0144943 A1 | 6/2007 | Lemaire et al. |
| 2007/0277674 A1 | 12/2007 | Hirano et al. |
| 2008/0034789 A1 | 2/2008 | Fieler et al. |
| 2008/0091316 A1 | 4/2008 | Szczublewski |
| 2008/0092589 A1 | 4/2008 | Trainer et al. |
| 2008/0307827 A1 | 12/2008 | Hino et al. |
| 2009/0023605 A1 | 1/2009 | Lebl et al. |
| 2009/0220406 A1 | 9/2009 | Rahman |
| 2010/0011809 A1 | 1/2010 | Mak |
| 2010/0018248 A1 | 1/2010 | Fieler et al. |
| 2010/0024472 A1 | 2/2010 | Amin et al. |
| 2010/0064725 A1 | 3/2010 | Chieng et al. |
| 2010/0107687 A1 | 5/2010 | Andrian et al. |
| 2010/0132405 A1 | 6/2010 | Nilsen |
| 2010/0147022 A1 | 6/2010 | Hart et al. |
| 2010/0187181 A1 | 7/2010 | Sortwell |
| 2010/0310439 A1 | 12/2010 | Brok et al. |
| 2011/0132034 A1 | 6/2011 | Beaumont et al. |
| 2011/0154856 A1 | 6/2011 | Andrian et al. |
| 2011/0168019 A1 | 7/2011 | Northrop et al. |
| 2011/0192190 A1 | 8/2011 | Andrian et al. |
| 2011/0265512 A1 | 11/2011 | Bearden et al. |
| 2012/0006055 A1 | 1/2012 | Van Santen et al. |
| 2012/0031143 A1 | 2/2012 | Van Santem et al. |
| 2012/0031144 A1 | 2/2012 | Northrop et al. |
| 2012/0079852 A1 | 4/2012 | Northrop et al. |
| 2012/0103193 A1 | 5/2012 | Polderman |
| 2012/0125043 A1 | 5/2012 | Cullinane et al. |
| 2012/0204599 A1 | 8/2012 | Northrop et al. |
| 2012/0279728 A1 | 11/2012 | Northrop et al. |
| 2013/0032029 A1 | 2/2013 | Mak |
| 2013/0074541 A1 | 3/2013 | Kaminsky et al. |
| 2013/0098105 A1 | 4/2013 | Northrop |
| 2014/0137599 A1 | 5/2014 | Oelfke et al. |
| 2015/0158796 A1 | 6/2015 | Valencia et al. |
| 2015/0159939 A1 | 6/2015 | Valencia et al. |
| 2015/0159940 A1 | 6/2015 | Valencia et al. |
| 2015/0159941 A1 | 6/2015 | Valencia et al. |
| 2015/0159942 A1 | 6/2015 | Valencia et al. |
| 2015/0159943 A1 | 6/2015 | Valencia et al. |
| 2015/0159944 A1 | 6/2015 | Valencia et al. |
| 2015/0159945 A1 | 6/2015 | Valencia et al. |
| 2015/0159946 A1 | 6/2015 | Valencia et al. |
| 2015/0159947 A1 | 6/2015 | Valencia et al. |
| 2016/0040929 A1 | 2/2016 | Hammon et al. |

FOREIGN PATENT DOCUMENTS

| | | |
|---|---|---|
| EP | 0 508 244 | 10/1992 |
| EP | 1 338 557 | 3/2005 |
| GB | 1010403 | 11/1965 |
| WO | WO 2002/032536 | 4/2002 |
| WO | WO 2002/039038 | 5/2002 |
| WO | WO 2004/047956 | 6/2004 |
| WO | WO 2008/034789 | 3/2008 |
| WO | WO 2008/095258 | 8/2008 |
| WO | WO 2008/152030 | 12/2008 |
| WO | WO 2009/023605 | 2/2009 |
| WO | WO 2009/029353 | 3/2009 |
| WO | WO 2009/087206 | 7/2009 |
| WO | WO 2010/023238 | 3/2010 |
| WO | WO 2010/052299 | 5/2010 |
| WO | WO 2010/136442 | 12/2010 |
| WO | WO 2011/026170 | 3/2011 |
| WO | WO 2013/095828 | 6/2013 |
| WO | WO 2013/142100 | 9/2013 |

OTHER PUBLICATIONS

Amin, R. (2003) "Advanced Mini Natural Gas Liquefier," *LNG Journal*, Mar.-Apr. 2003, pp. 20-23.

Black, S. (2006) "Chilled Ammonia Process for CO2 Capture," *Alstom Position Paper*, Nov. 2006, 6 pgs.

Ciulla, Vincent (2007) "How the Engine Works," About.com, Mar. 21, 2007, [retrieved from the internet on Aug. 17, 2012]. <URL: http://autorepair.about.com/cs/generalinfo/a/aa060500a.html>.

"Cryogenics" *Science Clarified*, May 2, 2006 [retrieved from the internet on Aug. 17, 2012]. <URL: http://www.scienceclarified.com/Co-Di/Cryogenics.html>.

Denton, R. D. et al. (1985) "Integrated Low Temperature Processing of Sour Natural Gas," *Gas Processors Assoc., 64th Ann. Conv.*, pp. 92-96.

Guccione, E. (1963) "New Approach to Recovery of Helium from Natural Gas," Chem. Engr., Sep. 30, 1963, pp. 76-78.

Hassan, S. M. N. (2005) "Techno-Economic Study of $CO_2$ Capture Process for Cement Plants," *University of Waterloo—Thesis*.

Haut, R. C. et al. (1988) "Development and Application of the Controlled Freeze Zone Process," *SPE 17757, SPE Gas Tech. Symp.*—Dallas, TX, pp. 435-443.

Haut, R. C. et al. (1988) "Development and Application of the Controlled Freeze Zone Process," *OSEA 88197, 7th Offshore So. East Asia Conf.*, Singapore, Feb. 1988, pp. 840-848.

Haut, R. C. et al. (1989) "Development and Application of the Controlled Freeze Zone Process," *SPE Production Engineering*, Aug. 1989, pp. 265-271.

Im, U. K. et al. (1971) "Heterogeneous Phase Behavior of Carbon Dioxide in n-Hexane and n-Heptane at Low Temperatures," *Jrnl. of Chem. Engineering Data*, v.16.4, pp. 412-415.

Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conf.*, Feb. 25-27, 2007.

(56) References Cited

OTHER PUBLICATIONS

Northrop, P. Scott et al. (2004) "Cryogenic Sour Gas Process Attractive for Acid Gas Injection Applications," *83$^{rd}$ Ann. Gas Processors Assoc. Convention*, New Orleans, LA., pp. 1-8 (XP007912217).
Pagcatipunan, C. et al. (2005) "Maximize the Performance of Spray Nozzle Systems," *CEP Magazine*, Dec. 2005, pp. 38-44.
Reyes, S. C. et al. (1997) "Frequency Modulation Methods for Diffusion and Adsorption Measurements in Porous Solids," *J. Phys. Chem. B*, v.101, pp. 614-622.
Rubin, E. S. et al. (2002) "A Technical, Economic and Environmental Assessment of Amine-based CO2 Capture Technology for Power Plant Greenhouse Gas Control," *U.S. Dept. of Energy*, Oct. 2002, DOE/DE-FC26-00NT40935, 26 pages.
Spero, C. (2007) "Callide Oxyfuel Project," *CS Energy, cLET Seminar*, Jul. 12, 2007, 9 pages.
Thomas, E. R. et al. (1987) "Conceptual Studies Using the Controlled Freeze Zone (CFZ) Process," *AIChE Summer Nat'l Mtg.*, Aug. 16-19, 1987.
Thomas, E. R. et al. (1988) "Conceptual Studies for $CO_2$/Natural Gas Separation Using the Control Freeze Zone (CFZ) Process," *Gas Separation and Purification*, v. 2, pp. 84-89.
Valencia, J. A. et al. (2008) "Controlled Freeze Zone™ Technology for Enabling Processing of High $CO_2$ and $H_2S$ Gas Reserves," SPE-IPTC 12708, Kuala Lumpur, IN, v.4.1, Jan. 2008, pp. 2358-2363.
Victory, D. J. et al. (1987) "The CFZ Process: Direct Methane-Carbon Dioxide Fractionation," *66$^{th}$ Ann. GPA Convention*, Mar 16-18, Denver, CO.
Wilson, R.W. et al. (1968) "Helium: Its Extraction and Purification," *Journ. Petrol. Tech.*, v. 20, pp. 341-344.

MIXING AND HEAT INTEGRATION OF MELT TRAY LIQUIDS IN A CRYOGENIC DISTILLATION TOWER

CROSS REFERENCE TO RELATED APPLICATIONS

This application claims the priority benefit of U.S. Provisional Patent Application No. 62/691,679 filed Jun. 29, 2018, entitled MIXING AND HEAT INTEGRATION OF MELT TRAY LIQUIDS IN A CRYOGENIC DISTILLATION TOWER.

This application is related to but does not claim priority to U.S. Provisional patent application Nos. 61/912,975 Filed Dec. 6, 2013 and titled METHOD AND SYSTEM FOR SEPARATING A FEED STREAM WITH A FEED STREAM DISTRIBUTION MECHANISM; 61/912,957 filed on Dec. 6, 2013 and titled METHOD AND DEVICE FOR SEPARATING HYDROCARBONS AND CONTAMINANTS WITH A SPRAY ASSEMBLY; 62/044,770 filed on Sep. 2, 2014 and titled METHOD AND DEVICE FOR SEPARATING HYDROCARBONS AND CONTAMINANTS WITH A SPRAY ASSEMBLY; 61/912,959 filed on Dec. 6, 2013 and titled METHOD AND SYSTEM OF MAINTAINING A LIQUID LEVEL IN A DISTILLATION TOWER; 61/912,964 filed on Dec. 6, 2013 and titled METHOD AND DEVICE FOR SEPARATING A FEED STREAM USING RADIATION DETECTORS; 61/912,970 filed on Dec. 6, 2013 and titled METHOD AND SYSTEM OF DEHYDRATING A FEED STREAM PROCESSED IN A DISTILLATION TOWER; 61/912,978 filed on Dec. 6, 2013 and titled METHOD AND SYSTEM FOR PREVENTING ACCUMULATION OF SOLIDS IN A DISTILLATION TOWER; 61/912,983 filed on Dec. 6, 2013 and titled METHOD OF REMOVING SOLIDS BY MODIFYING A LIQUID LEVEL IN A DISTILLATION TOWER; 61/912,984 filed on Dec. 6, 2013 and titled METHOD AND SYSTEM OF MODIFYING A LIQUID LEVEL DURING START-UP OPERATIONS; 61/912,986 filed on Dec. 6, 2013 and titled METHOD AND DEVICE FOR SEPARATING HYDROCARBONS AND CONTAMINANTS WITH A HEATING MECHANISM TO DESTABILIZE AND/OR PREVENT ADHESION OF SOLIDS; and 61/912,987 filed on Dec. 6, 2013 and titled METHOD AND DEVICE FOR SEPARATING HYDROCARBONS AND CONTAMINANTS WITH A SURFACE TREATMENT MECHANISM.

This application is also related to U.S. Application No. 62/691,676, titled HYBRID TRAY FOR INTRODUCING A LOW CO2 FEED STREAM INTO A DISTILLATION TOWER, having common inventors with this application, and filed on the same date as this application.

BACKGROUND

Fields of Disclosure

The disclosure relates generally to the field of fluid separation. More specifically, the disclosure relates to the cryogenic separation of contaminants, such as acid gas, from a hydrocarbon.

Description of Related Art

This section is intended to introduce various aspects of the art, which may be associated with the present disclosure. This discussion is intended to provide a framework to facilitate a better understanding of particular aspects of the present disclosure. Accordingly, it should be understood that this section should be read in this light, and not necessarily as admissions of prior art.

The production of natural gas hydrocarbons, such as methane and ethane, from a reservoir oftentimes carries with it the incidental production of non-hydrocarbon gases. Such gases include contaminants, such as at least one of carbon dioxide ("$CO_2$"), hydrogen sulfide ("$H_2S$"), carbonyl sulfide, carbon disulfide and various mercaptans. When a feed stream being produced from a reservoir includes these contaminants mixed with hydrocarbons, the stream is oftentimes referred to as "sour gas."

Many natural gas reservoirs have relatively low percentages of hydrocarbons and relatively high percentages of contaminants. Contaminants may act as a diluent and lower the heat content of hydrocarbons. Some contaminants, like sulfur-bearing compounds, are noxious and may even be lethal. Additionally, in the presence of water some contaminants can become quite corrosive.

It is desirable to remove contaminants from a stream containing hydrocarbons to produce sweet and concentrated hydrocarbons. Specifications for pipeline quality natural gas typically call for a maximum of 2-4% $CO_2$ and ¼ grain $H_2S$ per 100 scf (4 ppmv) or 5 mg/Nm3 $H_2S$. Specifications for lower temperature processes such as natural gas liquefaction plants or nitrogen rejection units typically require less than 50 ppm $CO_2$.

The separation of contaminants from hydrocarbons is difficult and consequently significant work has been applied to the development of hydrocarbon/contaminant separation methods. These methods can be placed into three general classes: absorption by solvents (physical, chemical and hybrids), adsorption by solids, and distillation.

Separation by distillation of some mixtures can be relatively simple and, as such, is widely used in the natural gas industry. However, distillation of mixtures of natural gas hydrocarbons, primarily methane, and one of the most common contaminants in natural gas, carbon dioxide, can present significant difficulties. Conventional distillation principles and conventional distillation equipment are predicated on the presence of only vapor and liquid phases throughout the distillation tower. The separation of $CO_2$ from methane by distillation involves temperature and pressure conditions that result in solidification of $CO_2$ if a pipeline or better quality hydrocarbon product is desired. The required temperatures are cold temperatures typically referred to as cryogenic temperatures.

Certain cryogenic distillations can overcome the above mentioned difficulties. These cryogenic distillations provide the appropriate mechanism to handle the formation and subsequent melting of solids during the separation of solid-forming contaminants from hydrocarbons. The formation of solid contaminants in equilibrium with vapor-liquid mixtures of hydrocarbons and contaminants at particular conditions of temperature and pressure takes place in a controlled freeze zone (CFZ) section. A lower section may also help separate the contaminants from the hydrocarbons but the lower section is operated at a temperature and pressure that does not form solids.

In known cryogenic distillation applications using a CFZ section, a feed stream is dried and precooled to about −60° F. before introduction to the distillation tower below the CFZ section and melt tray. The vapor component of the cooled feed stream combines with the vapor rising from the stripping section of the tower and bubbles through the liquid on the melt tray. This serves several beneficial purposes, including: the rising vapor stream is cooled and a portion of the $CO_2$ is condensed, resulting in a cooler and cleaner gas stream entering the open portion of the CFZ spray chamber; the rising vapor stream is evenly distributed across the tower cross section as it enters the CFZ spray chamber; most of the required melt tray heat input is provided via sensible heat from cooling the vapor and latent heat from condensing a portion of the $CO_2$ in the gas stream; and the melt tray liquid is vigorously mixed, which facilitates melting of solid $CO_2$ particles falling into the melt tray with the bulk liquid temperature only 2 to 3 degrees F. above the melting point of $CO_2$.

To achieve reliable melting of solids falling into the melt tray liquid, it is important that the melt tray liquid be maintained slightly above the melting point of $CO_2$ and well mixed. In a standard cryogenic distillation design having a CFZ section, the mixing is achieved via vapor bubbling through the liquid. This vapor also provides the majority of the heat input required for the melt tray. A heating coil immersed in the melt tray liquid is used for fine tune control.

SUMMARY

The present disclosure provides a device and method for separating contaminants from hydrocarbons, among other things.

In an aspect, a cryogenic distillation tower is provided for separating a feed stream. A distillation section permits vapor to rise upwardly therefrom. One or more lines direct the feed stream into the distillation tower. A controlled freeze zone section is situated above the distillation section. The controlled freeze zone is constructed and arranged to form a solid from the feed stream. The controlled freeze zone section includes a spray assembly in an upper section of the controlled freeze zone, and a melt tray assembly in a lower section of the controlled freeze zone. The melt tray assembly includes at least one vapor stream riser that directs the vapor from the distillation section into liquid retained by the melt tray assembly, and one or more draw-off openings positioned to permit a portion of the liquid retained by the melt tray assembly to exit the controlled freeze zone section. A heat exchanger heats the portion of the liquid through indirect heat exchange with a heating fluid. One or more return inlets return the portion of the liquid to the melt tray assembly after the portion of the liquid has been heated in the heat exchanger.

In another aspect, a method is provided for cryogenically separating contaminants from a feed stream in a distillation tower. The feed stream is directed into the distillation tower. Vapor is permitted to rise upwardly from a distillation section of the distillation tower. A solid is formed in a controlled freeze zone section of the distillation tower. The controlled freeze zone section is situated above the distillation section. The solid comprises contaminants in the feed stream. The vapor from the distillation section is directed into liquid retained by a melt tray assembly using at least one vapor stream riser. The solid is melted using the liquid retained by the melt tray assembly. A portion of the liquid retained by the melt tray assembly is permitted to exit the controlled freeze zone section. The portion of the liquid is heated through indirect heat exchange with a heating fluid in a heat exchanger. The portion of the liquid is returned to the melt tray assembly after the liquid has been heated in the heat exchanger.

The foregoing has broadly outlined the features of the present disclosure in order that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
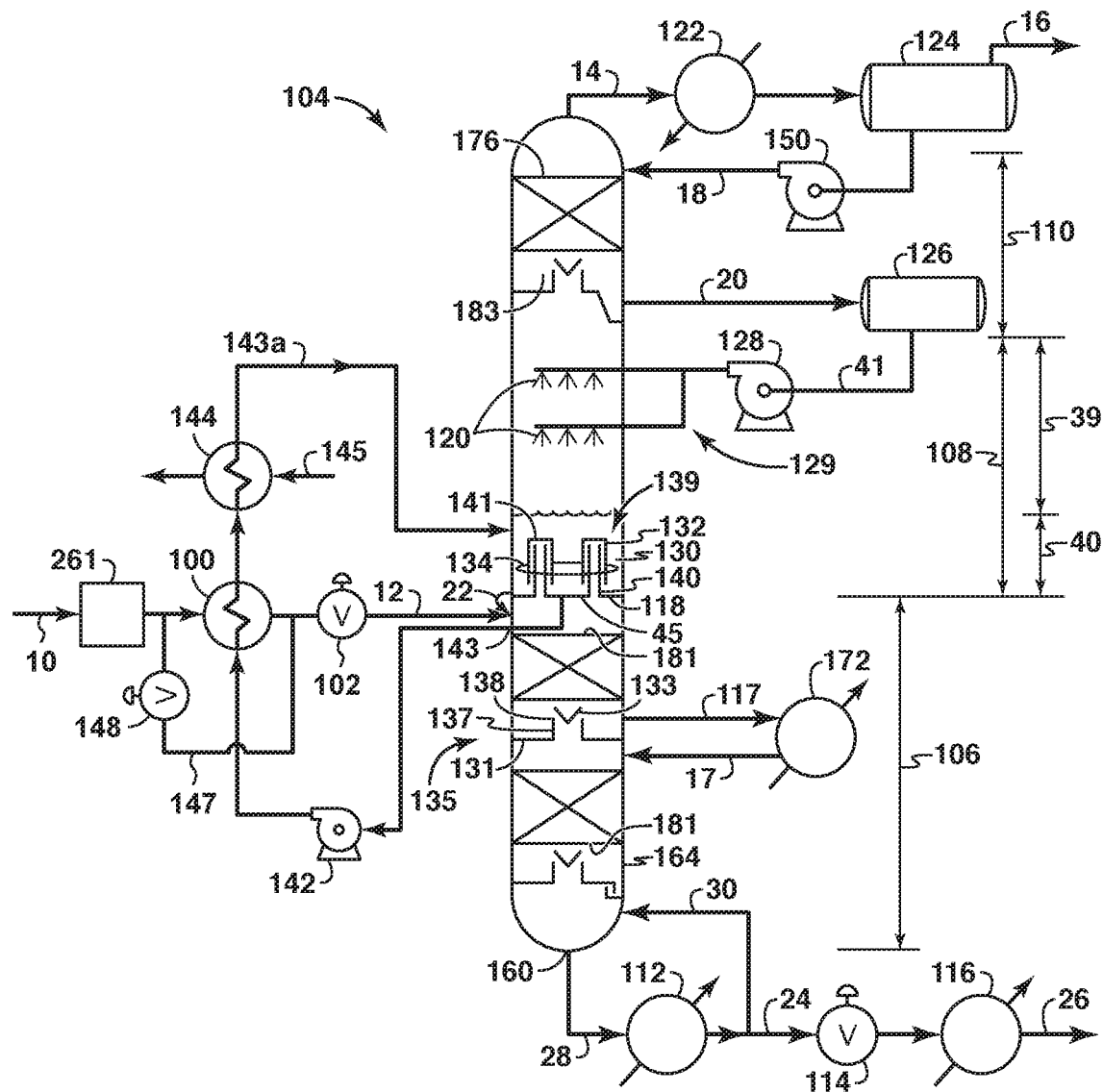
FIG. 1 is a schematic diagram of a tower with sections within a single vessel.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are not relevant to the present disclosure may not be shown in the drawings for the sake of clarity.

As referenced in this application, the terms "stream," "gas stream," "vapor stream," and "liquid stream" refer to different stages of a feed stream as the feed stream is processed in a distillation tower that separates methane, the primary hydrocarbon in natural gas, from contaminants. Although the phrases "gas stream," "vapor stream," and "liquid stream," refer to situations where a gas, vapor, and liquid is mainly present in the stream, respectively, there may be other phases also present within the stream. For example, a gas may also be present in a "liquid stream." In some instances, the terms "gas stream" and "vapor stream" may be used interchangeably.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described are considered to be within the scope of the disclosure.

The articles "the", "a" and "an" are not necessarily limited to mean only one, but rather are inclusive and open ended so as to include, optionally, multiple such elements.

The disclosure relates to a system and method for separating a feed stream in a distillation tower. The system and method helps optimally match where the feed stream should enter the distillation tower based on the concentrations of components in the feed stream so as to improve energy efficiency and/or optimally size the distillation tower. The system and method may also help prevent the undesired accumulation of solids in the controlled freeze zone section of the distillation tower. FIGS. 1-7 of the disclosure display various aspects of the system and method.

Figure 2:
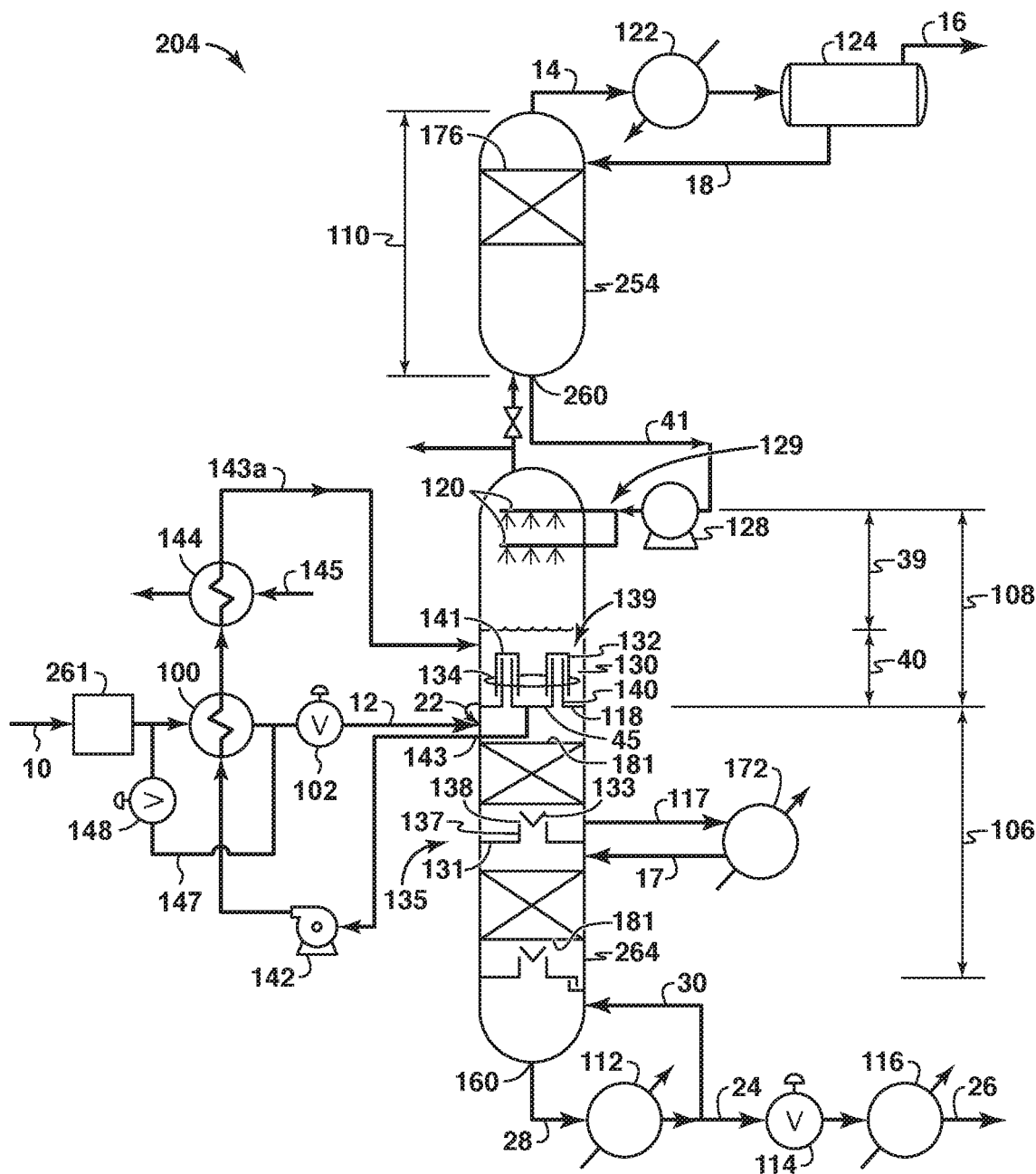
FIG. 2 is a schematic diagram of a tower with sections within multiple vessels.

The system and method may separate a feed stream having methane and contaminants. The system may comprise a distillation tower 104, 204 (FIGS. 1-2). The distillation tower 104, 204 may separate the contaminants from the methane.

The distillation tower 104, 204 may be separated into three functional sections: a lower section 106, a middle controlled freeze zone section 108 and an upper section 110. The distillation tower 104, 204 may incorporate three functional sections when the upper section 110 is needed and/or desired.

The distillation tower 104, 204 may incorporate only two functional sections when the upper section 110 is not needed and/or desired. When the distillation tower does not include an upper section 110, a portion of vapor leaving the middle controlled freeze zone section 108 may be condensed in a condenser 122 and returned as a liquid stream via a spray assembly 129. Moreover, lines 18 and 20 may be eliminated, elements 124 and 126 may be one and the same, and elements 150 and 128 may be one and the same. The stream in line 14, now taking the vapors leaving the middle controlled freeze section 108, directs these vapors to the condenser 122.

The lower section 106 may also be referred to as a stripper section. The middle controlled freeze zone section 108 may also be referred to as a controlled freeze zone section. The upper section 110 may also be referred to as a rectifier section.

Figure 3:
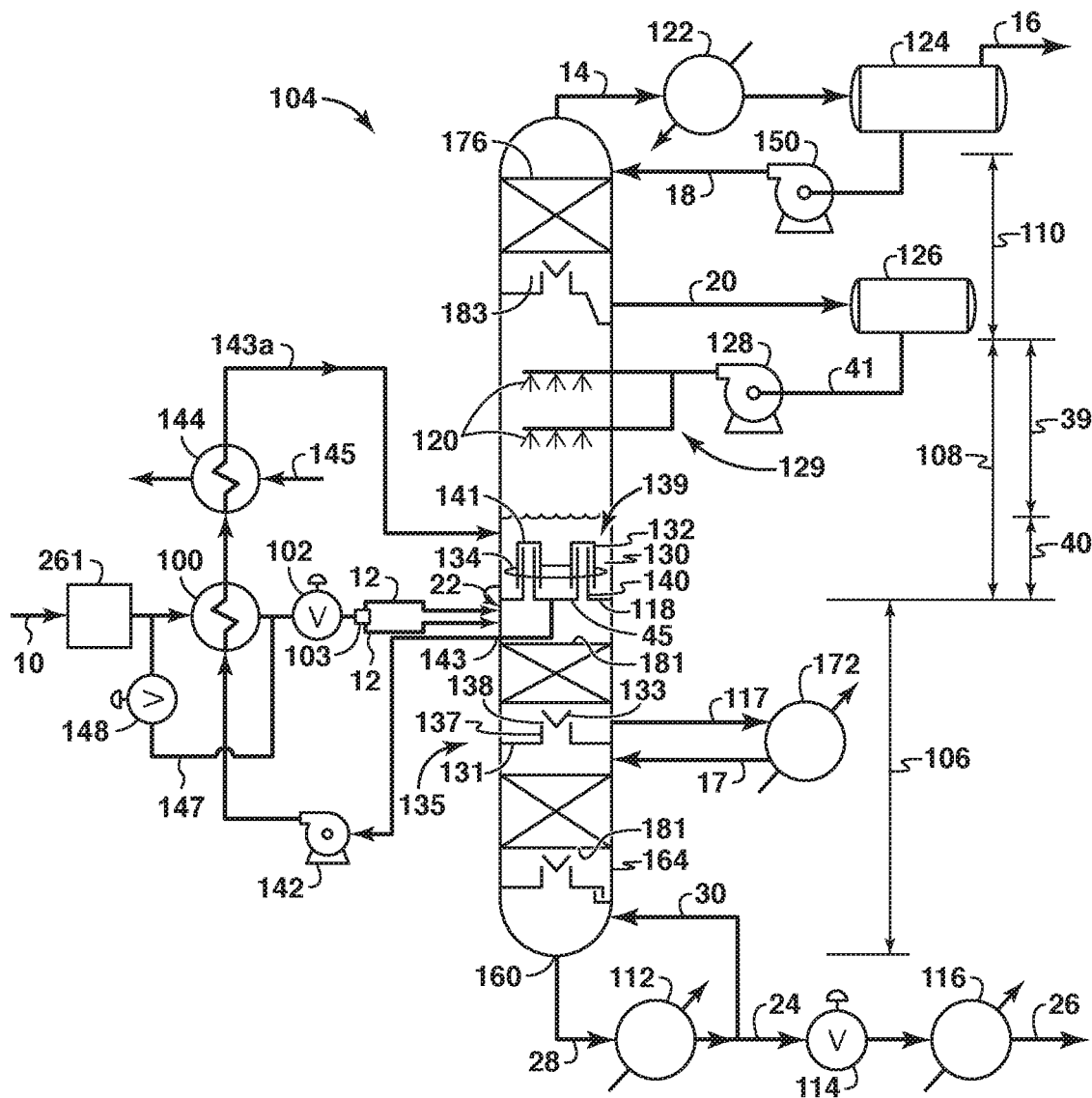
FIG. 3 is a schematic diagram of a tower with sections within a single vessel.

The sections of the distillation tower 104 may be housed within a single vessel (FIGS. 1 and 3). For example, the lower section 106, the middle controlled freeze zone section 108, and the upper section 110 may be housed within a single vessel 164.

Figure 4:
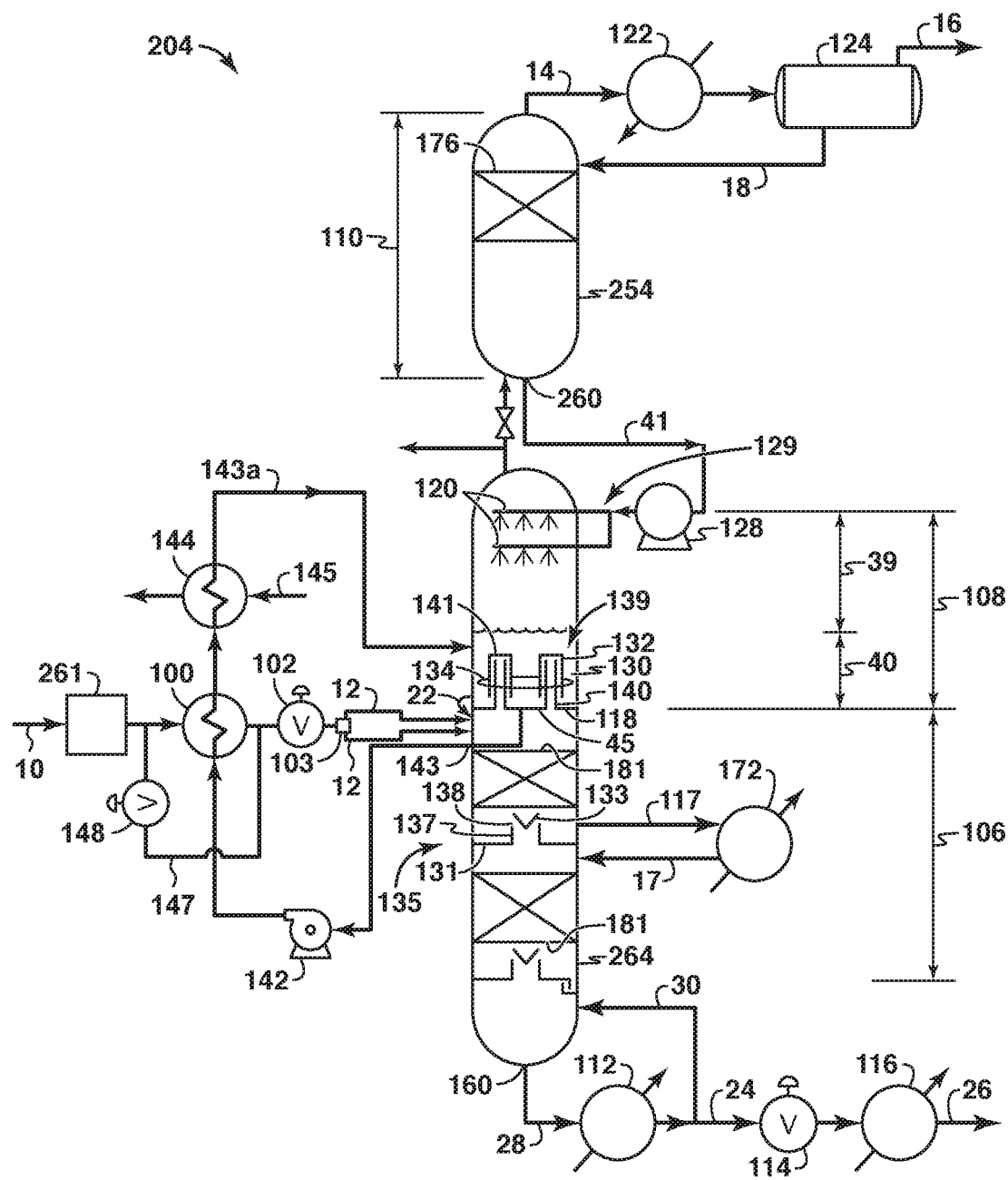
FIG. 4 is a schematic diagram of a tower with sections within multiple vessels.
Figure 6:
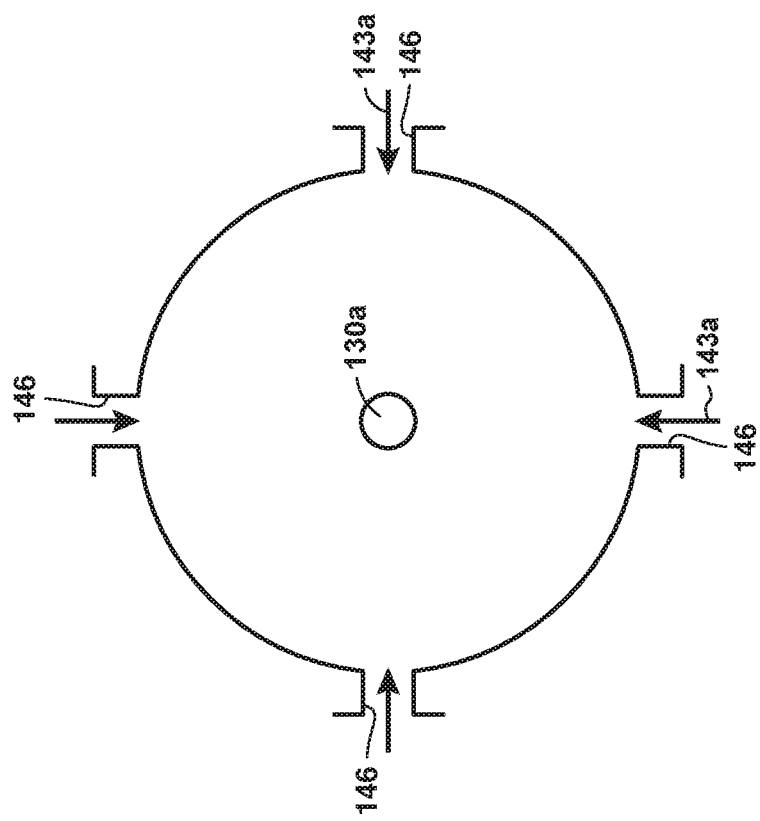
FIG. 6 is a top plan view of a melt tray according to disclosed aspects.

The sections of the distillation tower 204 may be housed within a plurality of vessels to form a split-tower configuration (FIGS. 2 and 4). Each of the vessels may be separate from the other vessels. Piping and/or another suitable mechanism may connect one vessel to another vessel. In this instance, the lower section 106, middle controlled freeze zone section 108 and upper section 110 may be housed within two or more vessels. For example, as shown in FIGS. 2 and 4, the upper section 110 may be housed within a single vessel 254 and the lower and middle controlled freeze zone sections 106, 108 may be housed within a single vessel 264. When this is the case, a liquid stream exiting the upper section 110, may exit through a liquid outlet bottom 260. The liquid outlet bottom 260 is at the bottom of the upper section 110. Although not shown, each of the sections may be housed within its own separate vessel, or one or more section may be housed within separate vessels, or the upper and middle controlled freeze zone sections may be housed within a single vessel and the lower section may be housed within a single vessel, etc. When sections of the distillation tower are housed within vessels, the vessels may be side-by-side along a horizontal line and/or above each other along a vertical line.

The split-tower configuration may be beneficial in situations where the height of the distillation tower, motion considerations, and/or transportation issues, such as for remote locations, need to be considered. This split-tower configuration allows for the independent operation of one or more sections. For example, when the upper section is housed within a single vessel and the lower and middle controlled freeze zone sections are housed within a single vessel, independent generation of reflux liquids using a substantially contaminant-free, largely hydrocarbon stream from a packed gas pipeline or an adjacent hydrocarbon line, may occur in the upper section. And the reflux may be used to cool the upper section, establish an appropriate temperature profile in the upper section, and/or build up liquid inventory at the bottom of the upper section to serve as an initial source of spray liquids for the middle controlled freeze zone section. Moreover, the middle controlled freeze zone and lower sections may be independently prepared by chilling the feed stream, feeding it to the optimal location be that in the lower section or in the middle controlled freeze zone section, generating liquids for the lower and the middle controlled freeze zone sections, and disposing the vapors off the middle controlled freeze zone section while they are off specification with too high a contaminant content. Also, liquid from the upper section may be intermittently or continuously sprayed, building up liquid level in the bottom of the middle controlled freeze zone section and bringing the contaminant content in the middle controlled freeze zone section down and near steady state level so that the two vessels may be connected to send the vapor stream from the middle controlled freeze zone section to the upper section, continuously spraying liquid from the bottom of the upper section into the middle controlled freeze zone section and stabilizing operations into steady state conditions. The split tower configuration may utilize a sump of the upper section as a liquid receiver for the pump 128, therefore obviating the need for a liquid receiver 126 in FIGS. 1 and 3.

The system may also include a heat exchanger 100 (FIGS. 1-4). The feed stream 10 may enter the heat exchanger 100 before entering the distillation tower 104, 204. The feed stream 10 may be cooled within the heat exchanger 100. The heat exchanger 100 helps drop the temperature of the feed stream 10 to a level suitable for introduction into the distillation tower 104, 204.

The system may include an expander device 102 (FIGS. 1-4). The feed stream 10 may enter the expander device 102 before entering the distillation tower 104, 204. The feed stream 10 may be expanded in the expander device 102 after exiting the heat exchanger 100. The expander device 102 helps drop the temperature of the feed stream 10 to a level suitable for introduction into the distillation tower 104, 204. The expander device 102 may be any suitable device, such as a valve. If the expander device 102 is a valve, the valve may be any suitable valve that may aid in cooling the feed stream 10 before it enters the distillation tower 104, 204. For example, the valve 102 may comprise a Joule-Thompson (J-T) valve.

The system may include a feed separator 103 (FIGS. 3-4). The feed stream may enter the feed separator before entering the distillation tower 104, 204. The feed separator may separate a feed stream having a mixed liquid and vapor stream into a liquid stream and a vapor stream. Lines 12 may extend from the feed separator to the distillation tower 104, 204. One of the lines 12 may receive the vapor stream from the feed separator. Another one of the lines 12 may receive the liquid stream from the feed separator. Each of the lines 12 may extend to the same and/or different sections (i.e. middle controlled freeze zone, and lower sections) of the distillation tower 104, 204. The expander device 102 may or may not be downstream of the feed separator 103. The expander device 102 may comprise a plurality of expander devices 102 such that each line 12 has an expander device 102.

The system may include a dehydration unit 261 (FIGS. 1-4). The feed stream 10 may enter the dehydration unit 261 before entering the distillation tower 104, 204. The feed stream 10 enters the dehydration unit 261 before entering the heat exchanger 100 and/or the expander device 102. The dehydration unit 261 removes water from the feed stream 10 to prevent water from later presenting a problem in the heat exchanger 100, expander device 102, feed separator 103, or distillation tower 104, 204. The water can present a problem by forming a separate water phase (i.e., ice and/or hydrate) that plugs lines, equipment or negatively affects the distillation process. The dehydration unit 261 dehydrates the feed stream to a dew point sufficiently low to ensure a separate water phase does not form at any point downstream during the rest of the process. The dehydration unit may be any suitable dehydration mechanism, such as a molecular sieve or a glycol dehydration unit.

The system may include a filtering unit (not shown). The feed stream 10 may enter the filtering unit before entering the distillation tower 104, 204. The filtering unit may remove undesirable contaminants from the feed stream before the feed stream enters the distillation tower 104, 204. Depending on what contaminants are to be removed, the filtering unit may be before or after the dehydration unit 261 and/or before or after the heat exchanger 100.

The system may include lines 12. Each of the lines may be referred to as an inlet channel 12. The feed stream is introduced into the distillation tower 104, 204 through one of the lines 12. One or more lines 12 may extend to the lower section 106 or the middle controlled freeze zone section 108 of the distillation tower 104, 204 to another of the lines 12. For example, the line 12 may extend to the lower section 106 such that the feed stream 10 may enter the lower section 106 of the distillation tower 104, 204 (FIGS. 1-4). Each line 12 may directly or indirectly extend to the lower section 106 or the middle controlled freeze zone section 108. Each line 12 may extend to an outer surface of the distillation tower 104, 204 before entering the distillation tower.

If the system includes the feed separator 103 (FIGS. 3-4), the line 12 may comprise a plurality of lines 12. Each line may be the same line as one of the lines that extends from the feed separator to a specific portion of the distillation tower 104, 204.

Before entering the distillation tower 104, 204, a sample of the feed stream 10 may enter an analyzer (not shown). The sample of the feed stream 10 may be a small sample of the feed stream 10. The feed stream 10 may comprise feed from multiple feed sources or feed from a single feed source. Each feed source may comprise, for example, a separate reservoir, one or more wellbores within one or more reservoirs, etc. The analyzer may determine the percentage of $CO_2$ in the sample of the feed stream 10 and, therefore, the content of $CO_2$ in the feed stream 10. The analyzer may connect to multiple lines 12 so that the feed stream 10 can be sent to one or more sections 106, 108 of the distillation tower 104, 204 after the sample of the feed stream 10 exits the analyzer. If the analyze determines that the percentage of $CO_2$ is greater than about 20% or greater than 20%, the analyzer may direct the feed stream to the line 12 extending from the lower section 106. If the analyzer determines that the percentage of $CO_2$ is less than about 20% or less than 20%, the analyzer may direct the feed stream to the line 12 extending from the middle controlled freeze zone section 108. The analyzer may be any suitable analyzer. For example, the analyzer may be a gas chromatograph or an IR analyzer. The analyzer may be positioned before the feed stream 10 enters the heat exchanger 100. The feed stream 10 entering the analyzer may be a single phase.

While the feed stream 10 may be introduced into any section of the distillation tower 104, 204 regardless of the percentage of $CO_2$ in the feed stream 10, it is more efficient to introduce the feed stream 10 into the section of the distillation tower 104, 204 that will employ the best use of energy. For this reason, it is preferable to introduce the feed stream to the lower section 106 when the percentage of $CO_2$ in the feed stream is greater than any percentage about 20% or greater than 20% and to the middle controlled freeze zone section 108 when the percentage of $CO_2$ in the feed stream is any percentage less than about 20% or less than 20%.

The feed stream may be directly or indirectly fed to one of the sections 106, 108. Thus, for the best use of energy it is best to introduce the feed stream into the distillation tower 104, 204 at the point in the distillation process of the distillation tower 104, 204 that matches the relevant percentage or content of $CO_2$ in the feed stream.

The feed stream 10 may enter a feed separator 103. The feed separator 103 separates a feed stream vapor portion from a feed stream liquid portion before the feed stream is introduced into the distillation tower 104, 204. The feed stream vapor portion may be fed to a different section or portion within a section of the distillation tower 104, 204 than the feed stream liquid portion. For example, the feed stream vapor portion may be fed to an upper controlled freeze zone section 39 of the middle controlled freeze zone section 108 and/or the feed stream liquid portion may be fed to a lower controlled freeze zone section 40 of the middle controlled freeze zone section 108 or to the lower section 106 of the distillation tower.

The lower section 106 is constructed and arranged to separate the feed stream 10 into an enriched contaminant bottom liquid stream (i.e., liquid stream) and a freezing zone vapor stream (i.e., vapor stream). The lower section 106 separates the feed stream at a temperature and pressure at which no solids form. The liquid stream may comprise a greater quantity of contaminants than of methane. The vapor stream may comprise a greater quantity of methane than of contaminants. In any case, the vapor stream is lighter than the liquid stream. As a result, the vapor stream rises from the lower section 106 and the liquid stream falls to the bottom of the lower section 106.

The lower section 106 may include and/or connect to equipment that separates the feed stream. The equipment may comprise any suitable equipment for separating methane from contaminants, such as one or more packed sections 181, or one or more distillation trays with perforations downcomers and weirs (FIGS. 1-4).

The equipment may include components that apply heat to the stream to form the vapor stream and the liquid stream. For example, the equipment may comprise a first reboiler 112 that applies heat to the stream. The first reboiler 112 may be located outside of the distillation tower 104, 204. The equipment may also comprise a second reboiler 172 that applies heat to the stream. The second reboiler 172 may be located outside of the distillation tower 104, 204. Line 117 may lead from the distillation tower to the second reboiler 172. Line 17 may lead from the second reboiler 172 to the distillation tower. Additional reboilers, set up similarly to the second reboiler described above, may also be used.

The first reboiler 112 may apply heat to the liquid stream that exits the lower section 106 through a liquid outlet 160 of the lower section 106. The liquid stream may travel from the liquid outlet 160 through line 28 to reach the first reboiler 112 (FIGS. 1-4). The amount of heat applied to the liquid stream by the first reboiler 112 can be increased to separate more methane from contaminants. The more heat applied by the reboiler 112 to the stream, the more methane separated from the liquid contaminants, though more contaminants will also be vaporized.

The first reboiler 112 may apply heat to the stream within the distillation tower 104, 204. Specifically, the heat applied by the first reboiler 112 warms up the lower section 106. This heat travels up the lower section 106 and supplies heat to warm solids entering a melt tray assembly 139 (FIGS. 1-4) of the middle controlled freeze zone section 108 so that the solids form a liquid and/or slurry mix.

The second reboiler 172 applies heat to the stream within the lower section 106. This heat is applied closer to the middle controlled freeze zone section 108 than the heat applied by the first reboiler 112. As a result, the heat applied by the second reboiler 172 reaches the middle controlled freeze zone section 108 faster than the heat applied by the first reboiler 112. The second reboiler 172 also helps with energy integration.

The equipment may include one or more chimney assemblies 135 (FIGS. 1-4). While falling to the bottom of the lower section 106, the liquid stream may encounter one or more of the chimney assemblies 135.

Each chimney assembly 135 includes a chimney tray 131 that collects the liquid stream within the lower section 106. The liquid stream that collects on the chimney tray 131 may be fed to the second reboiler 172. After the liquid stream is heated in the second reboiler 172, the stream may return to the middle controlled freeze zone section 108 to supply heat to the middle controlled freeze zone section 108 and/or the melt tray assembly 139. Unvaporized stream exiting the second reboiler 172 may be fed back to the distillation tower 104, 204 below the chimney tray 131. Vapor stream exiting the second reboiler 172 may be routed under or above the chimney tray 131 when the vapor stream enters the distillation tower 104, 204.

The chimney tray 131 may include one or more chimneys 137. The chimney 137 serves as a channel that the vapor stream in the lower section 106 traverses. The vapor stream travels through an opening in the chimney tray 131 at the bottom of the chimney 137 to the top of the chimney 137. The opening is closer to the bottom of the lower section 106 than it is to the bottom of the middle controlled freeze zone section 108. The top is closer to the bottom of the middle controlled freeze zone section 108 than it is to the bottom of the lower section 106.

Each chimney 137 has attached to it a chimney cap 133. The chimney cap 133 covers a chimney top opening 138 of the chimney 137. The chimney cap 133 prevents the liquid stream from entering the chimney 137. The vapor stream exits the chimney assembly 135 via the chimney top opening 138.

After falling to the bottom of the lower section 106, the liquid stream exits the distillation tower 104, 204 through the liquid outlet 160. The liquid outlet 160 is within the lower section 106 (FIGS. 1-4). The liquid outlet 160 may be located at the bottom of the lower section 106.

After exiting through the liquid outlet 160, the feed stream may travel via line 28 to the first reboiler 112. The feed stream may be heated by the first reboiler 112 and vapor may then re-enter the lower section 106 through line 30. Unvaporized liquid may continue out of the distillation process via line 24.

The systems may include an expander device 114 (FIGS. 1-4). After entering line 24, the heated liquid stream may be expanded in the expander device 114. The expander device 114 may be any suitable device, such as a valve. The valve 114 may be any suitable valve, such as a J-T valve.

The system may include a heat exchanger 116 (FIGS. 1-4). The liquid stream heated by the first reboiler 112 may be cooled or heated by the heat exchanger 116. The heat exchanger 116 may be a direct heat exchanger or an indirect heat exchanger. The heat exchanger 116 may comprise any suitable heat exchanger. After exiting the heat exchanger 116, the liquid stream exits the distillation process via line 26.

The vapor stream in the lower section 106 rises from the lower section 106 to the middle controlled freeze zone section 108. The middle controlled freeze zone section 108 is constructed and arranged to separate the feed stream 10 introduced into the middle controlled freeze zone section, or into the top of lower section 106, into a solid and a vapor stream. The middle controlled freeze zone section 108 forms a solid, which may comprise more of contaminants than of methane. The vapor stream (i.e., methane-enriched vapor stream) may comprise more methane than contaminants.

The middle controlled freeze zone section 108 includes a lower section 40 and an upper section 39. The lower section 40 is below the upper section 39. The lower section 40 directly abuts the upper section 39. The lower section 40 is primarily but not exclusively a heating section of the middle controlled freeze zone section 108. The upper section 39 is primarily but not exclusively a cooling section of the middle controlled freeze zone section 108. The temperature and pressure of the upper section 39 are chosen so that the solid can form in the middle controlled freeze zone section 108.

The middle controlled freeze zone section 108 may comprise a melt tray assembly 139 that is maintained in the middle controlled freeze zone section 108 (FIGS. 1-4). The melt tray assembly 139 is within the lower section 40 of the middle controlled freeze zone section 108. The melt tray assembly 139 is not within the upper section 39 of the middle controlled freeze zone section 108.

The melt tray assembly 139 is constructed and arranged to melt solids formed in the middle controlled freeze zone section 108. When the warm vapor stream rises from the lower section 106 to the middle controlled freeze zone section 108, the vapor stream immediately encounters the melt tray assembly 139 and supplies heat to melt the solids. As shown in FIGS. 1-4 and more particularly in FIGS. 5-6, the melt tray assembly 139 may comprise at least one of a melt tray 118, a bubble cap 132, a liquid 130, one or more draw-off openings 130*a*, one or more return inlets 146, and optionally may include a heat mechanism(s) 134.

The melt tray 118 may collect a liquid and/or slurry mix. The melt tray 118 divides at least a portion of the middle controlled freeze zone section 108 from the lower section 106. The melt tray 118 is at the bottom 45 of the middle controlled freeze zone section 108.

One or more bubble caps 132 may act as a channel for the vapor stream rising from the lower section 106 to the middle controlled freeze zone section 108. The bubble cap 132 may provide a path for the vapor stream up the riser 140 and then down and around the riser 140 to the melt tray 118. The riser 140 is covered by a cap 141. The cap 141 prevents the liquid 130 from travelling into the riser and it also helps prevent solids from travelling into the riser 140. The vapor stream's traversal through the bubble cap 132 allows the vapor stream to transfer heat to the liquid 130 within the melt tray assembly 139.

One or more heat mechanisms 134 may further heat up the liquid 130 to facilitate melting of the solids into a liquid and/or slurry mix. The heat mechanism(s) 134 may be located anywhere within the melt tray assembly 139. For example, as shown in FIGS. 1-4, a heat mechanism 134 may be located around bubble caps 132. The heat mechanism 134 may be any suitable mechanism, such as a heat coil. The heat source of the heat mechanism 134 may be any suitable heat source.

The liquid 130 in the melt tray assembly is heated by the vapor stream. The liquid 130 may also be heated by the one or more heat mechanisms 134. The liquid 130 helps melt the solids formed in the middle controlled freeze zone section 108 into a liquid and/or slurry mix. Specifically, the heat transferred by the vapor stream heats up the liquid, thereby enabling the heat to melt the solids. The liquid 130 is at a level sufficient to melt the solids.

Figure 5:
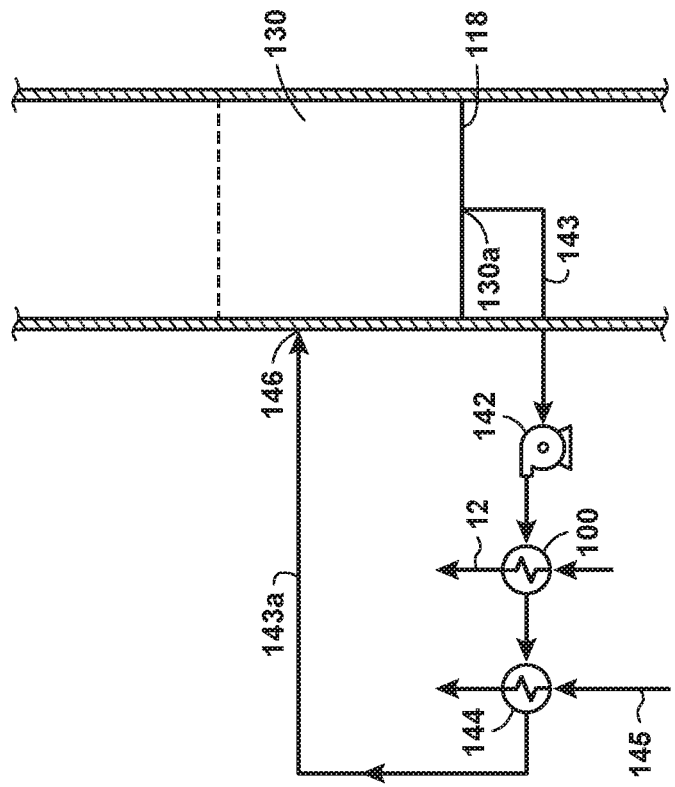
FIG. 5 is a side view of a middle controlled freeze zone section of a distillation tower.

According to an aspect of the disclosure, the liquid 130 may also be heated by drawing off part of the liquid, heating the liquid through heat exchange with one or more heat sources external to the controlled freeze zone section 108, and returning the heated liquid to the remainder of the liquid retained by the melt tray assembly 139. As shown in FIG. 5, one or more draw-off openings 130a may be included to draw off part of the liquid 130. The draw-off openings 130a may be positioned at or near the bottom of the melt tray 118. At least part of the liquid retained by the melt tray exits the draw-off openings 130a and is pumped, using pump 142, to one or more heat exchangers to heat or warm the liquid 130. The heat exchangers may include heat exchanger 100, which operates to drop the temperature of the feed stream 10 as previously described. The drawn-off liquid 143 may alternatively or additionally pass through one or more additional heat exchangers (depicted and described herein as additional heat exchanger 144) and be heated by a heating fluid 145. The heating fluid may be ethane, propane, or another suitable fluid, and is returned to heating source (not shown) after passing through the additional heat exchanger 144. Once heated by the heat exchanger 100 and/or the additional heat exchanger 144, the heated liquid 143a is returned to the melt tray assembly 139 through the one or more return inlets 146. The heated liquid 143a mixes with the liquid 130 and provides additional heat to melt solids retained in the liquid 130.

The use of heat exchanger 100 to heat liquid 130 may eliminate the necessity of heating element 134. Such elimination of the heating element 134 may significantly reduce the congestion and complexity of the melt tray assembly 139. Also, heating the liquid 130 in the heat exchanger 100, combined with recycling the heated liquid 143a back to the melt tray assembly 139, provides a more even heating operation to the liquid 130 across a wide range of operating conditions. In contrast, the heating element 134 could provide undesirable non-uniform heating, particularly at turndown conditions where the temperature pinches out well before the end of the heating element.

The heat exchanger 100 and/or the additional heat exchanger 144 may be advantageously used with applications in which low $CO_2$ feed gas (i.e., feed gas having a composition of less than 30 mol % $CO_2$, or less than 25 mol % $CO_2$, or less than 22 mol % $CO_2$, or less than 20 mol % $CO_2$) is introduced above the melt tray assembly 139, as is described, for example, in United States patent application titled "Hybrid Tray for Introducing a Low $CO_2$ Feed Stream into a Distillation Tower," being commonly owned and filed on an even date herewith, the disclosure of which is incorporated herein by reference in its entirety. In such a situation, the heat exchangers may provide beneficial heat integration between the relatively warmer feed gas (about −60° F., which is the lowest achievable temperature using a conventional propane-based refrigeration system plus Joule-Thompson cooling via valve 102) and the relatively colder melt tray liquid (about −75° F. to −80° F.). This would provide a means to cool the feed gas while maintaining its low $CO_2$ content. The heated liquid 143a provides a portion of the heat required to melt solids in the melt tray assembly 139, while the additional cooling of the feed gas reduces the load on the condenser 122 and associated equipment while the additional heating of the melt tray liquid reduces the heat input needed from other sources—such as the heating element 134.

According to aspects of the disclosure, the pumping rate of pump 142 may advantageously be established based on design parameters of the distillation tower 104, 204, such as tower size, sizes and locations of draw-off openings 130a and return inlets 146, and the like. In an aspect there should be no need to throttle or control the pumping rate during operation. Additionally, heat input to the additional heat exchanger 144, if present, should be controlled on the side of the heating fluid 145. In a preferred aspect the heat input may be adjusted to maintain a target temperature for the heated liquid 143a, drawn-off liquid, the liquid 130, or another location.

The duty for heat exchanger 100 should be maximized to provide the most efficient operation. As a precaution, a feed gas bypass line 147 and a bypass valve 148 may be used to permit the feed gas 10 to bypass the heat exchanger 100, thereby increasing the temperature of the feed gas. This option may be used if feed gas risers, which introduce feed gas above the liquid level of liquid 130, experience fouling from solid $CO_2$ in a low $CO_2$ environment.

The middle controlled freeze zone section 108 may also comprise a spray assembly 129. The spray assembly 129 cools the vapor stream that rises from the lower section 40. The spray assembly 129 sprays liquid, which is cooler than the vapor stream, on the vapor stream to cool the vapor stream. The spray assembly 129 is within the upper section 39. The spray assembly 129 is not within the lower section 40. The spray assembly 129 is above the melt tray assembly 139. In other words, the melt tray assembly 139 is below the spray assembly 129.

The spray assembly 129 includes one or more spray nozzles 120 (FIGS. 1-4). Each spray nozzle 120 sprays liquid on the vapor stream. The spray assembly 129 may also include a spray pump 128 (FIGS. 1-4) that pumps the liquid. Instead of a spray pump 128, gravity may induce flow in the liquid.

The liquid sprayed by the spray assembly 129 contacts the vapor stream at a temperature and pressure at which solids form. Solids, containing mainly contaminants, form when the sprayed liquid contacts the vapor stream. The solids fall toward the melt tray assembly 139.

The temperature in the middle controlled freeze zone section 108 cools down as the vapor stream travels from the bottom of the middle controlled freeze zone section 108 to the top of the middle controlled freeze zone section 108. The methane in the vapor stream rises from the middle controlled freeze zone section 108 to the upper section 110. Some contaminants may remain in the methane and also rise. The contaminants in the vapor stream tend to condense or solidify with the colder temperatures and fall to the bottom of the middle controlled freeze zone section 108.

The solids form the liquid and/or slurry mix when in the liquid 130. The liquid and/or slurry mix flows from the middle controlled freeze zone section 108 to the lower distillation section 106. At least part of the liquid and/or slurry mix flows from the bottom of the middle controlled freeze zone section 108 to the top of the lower section 106 via a line 22 (FIGS. 1-4). The line 22 may be an exterior line. The line 22 may extend from the distillation tower 104, 204. The line 22 may extend from the middle controlled freeze zone section 108. The line may extend to the lower section 106. The line 22 may extend from an outer surface of the distillation tower 104, 204.

As shown in FIGS. 1-2, the vapor stream that rises in the middle controlled freeze zone section 108 and does not form solids or otherwise fall to the bottom of the middle controlled freeze zone section 108, rises to the upper section 110. The upper section 110 operates at a temperature and pressure and contaminant concentration at which no solid forms. The upper section 110 is constructed and arranged to cool the vapor stream to separate the methane from the contaminants. Reflux in the upper section 110 cools the vapor stream. The reflux is introduced into the upper section 110 via line 18. Line 18 may extend to the upper section 110. Line 18 may extend from an outer surface of the distillation tower 104, 204.

After contacting the reflux in the upper section 110, the feed stream forms a vapor stream and a liquid stream. The vapor stream mainly comprises methane. The liquid stream comprises relatively more contaminants. The vapor stream rises in the upper section 110 and the liquid falls to a bottom of the upper section 110.

To facilitate separation of the methane from the contaminants when the stream contacts the reflux, the upper section 110 may include one or more mass transfer devices 176. Each mass transfer device 176 helps separate the methane from the contaminants. Each mass transfer device 176 may comprise any suitable separation device, such as a tray with perforations, or a section of random or structured packing to facilitate contact of the vapor and liquid phases.

After rising, the vapor stream may exit the distillation tower 104, 204 through line 14. The line 14 may emanate from an upper part of the upper section 110. The line 14 may extend from an outer surface of the upper section 110. From line 14, the vapor stream may enter a condenser 122. The condenser 122 cools the vapor stream to form a cooled stream. The condenser 122 at least partially condenses the stream. After exiting the condenser 122, the cooled stream may enter a separator 124. The separator 124 separates the vapor stream into liquid and vapor streams. The separator may be any suitable separator that can separate a stream into liquid and vapor streams, such as a reflux drum. Once separated, the vapor stream may exit the separator 124 as sales product. The sales product may travel through line 16 for subsequent sale to a pipeline and/or condensation to be liquefied natural gas. Once separated, the liquid stream may return to the upper section 110 through line 18 as the reflux. The reflux may travel to the upper section 110 via any suitable mechanism, such as a reflux pump 150 (FIGS. 1 and 3) or gravity (FIGS. 2 and 4).

The liquid stream (i.e., freezing zone liquid stream) that falls to the bottom of the upper section 110 collects at the bottom of the upper section 110. The liquid may collect on tray 183 (FIGS. 1 and 3) or at the bottommost portion of the upper section 110 (FIGS. 2 and 4). The collected liquid may exit the distillation tower 104, 204 through line 20 (FIGS. 1 and 3) or outlet 260 (FIGS. 2 and 4). The line 20 may emanate from the upper section 110. The line 20 may emanate from a bottom end of the upper section 110. The line 20 may extend from an outer surface of the upper section 110.

The line 20 and/or outlet 260 connect to a line 41. The line 41 leads to the spray assembly 129 in the middle controlled freeze zone section 108. The line 41 emanates from the holding vessel 126. The line 41 may extend to an outer surface of the middle controlled freeze zone section 108.

The line 20 and/or outlet 260 may directly or indirectly (FIGS. 1-4) connect to the line 41. When the line 20 and/or outlet 260 directly connect to the line 41, the liquid spray may be pumped to the spray nozzle(s) 120 via any suitable mechanism, such as the spray pump 128 or gravity. When the line 20 and/or outlet 260 indirectly connect to the line 41, the lines 20, 41 and/or outlet 260 and line 41 may directly connect to a holding vessel 126 (FIGS. 1 and 3). The holding vessel 126 may house at least some of the liquid spray before it is sprayed by the nozzle(s). The liquid spray may be pumped from the holding vessel 126 to the spray nozzle(s) 120 via any suitable mechanism, such as the spray pump 128 (FIGS. 1-2) or gravity. The holding vessel 126 may be needed when there is not a sufficient amount of liquid stream at the bottom of the upper section 110 to feed the spray nozzles 120.

Figure 7:
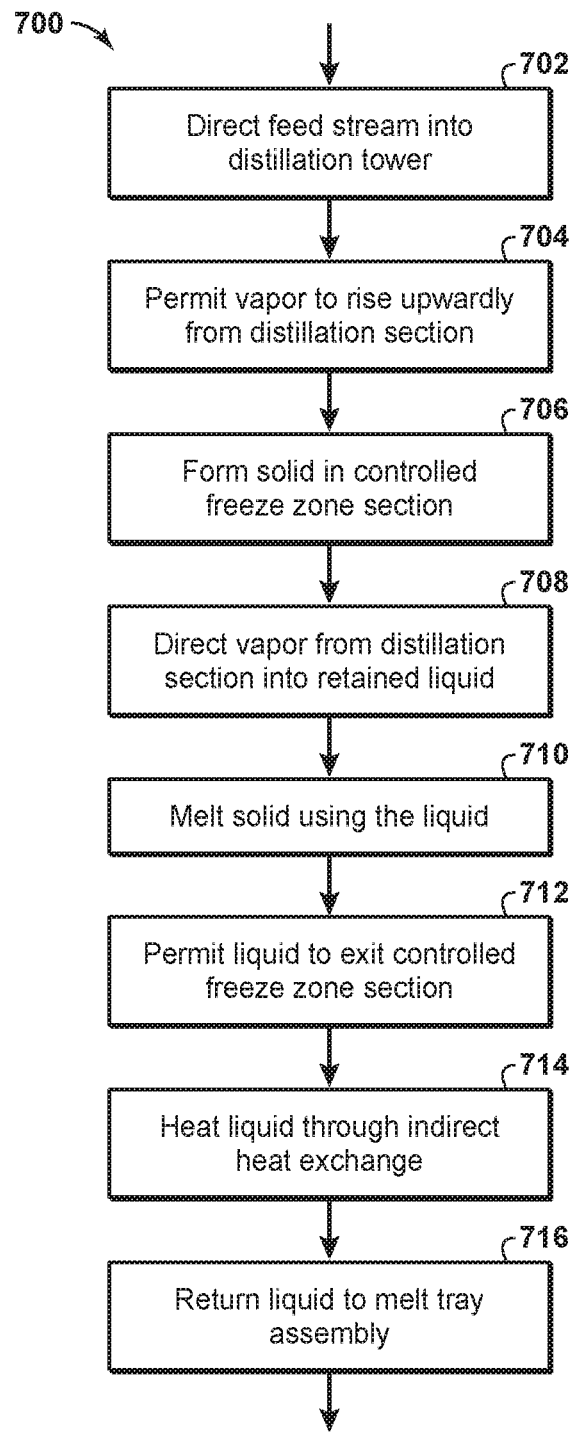
FIG. 7 is a flowchart of a method according to disclosed aspects.

FIG. 7 is a flowchart depicting a method 700 of cryogenically separating contaminants from a feed stream in a distillation tower according to disclosed aspects. At block 702 the feed stream is directed into the distillation tower. At block 704 vapor is permitted to rise upwardly from a distillation section of the distillation tower. At block 706 a solid is formed in a controlled freeze zone section of the distillation tower. The controlled freeze zone section is situated above the distillation section. The solid comprises contaminants in the feed stream. At block 708 the vapor from the distillation section into is directed into liquid retained by a melt tray assembly using at least one vapor stream riser. At block 710 the solid is melted using the liquid retained by the melt tray assembly. At block 712 a portion of the liquid retained by the melt tray assembly is permitted to exit the controlled freeze zone section. At block 714 the portion of the liquid is heated through indirect heat exchange with a heating fluid in a heat exchanger. At block 716 the portion of the liquid is returned to the melt tray assembly after the liquid has been heated in the heat exchanger.

It is important to note that the steps depicted in FIG. 7 are provided for illustrative purposes only and a particular step may not be required to perform the inventive methodology. The claims, and only the claims, define the inventive system and methodology.

Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. The disclosed methodologies and techniques may be used to produce hydrocarbons in a feed stream extracted from, for example, a subsurface region. The feed stream extracted may be processed in the distillation tower 104, 204 and separated into hydrocarbons and contaminants. The separated hydrocarbons exit the middle controlled freeze zone section 108 or the upper section 110 of the distillation tower. Some or all of the hydrocarbons that exit are produced. Hydrocarbon extraction may be conducted to remove the feed stream from for example, the subsurface region, which may be accomplished by drilling a well using oil well drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles.

Aspects of the disclosure may include any combinations of the methods and systems shown in the following numbered paragraphs. This is not to be considered a complete listing of all possible aspects, as any number of variations can be envisioned from the description above.

1. A cryogenic distillation tower for separating a feed stream, the distillation tower comprising:
   a distillation section permitting vapor to rise upwardly therefrom;
   one or more lines for directing the feed stream into the distillation tower;
   a controlled freeze zone section situated above the distillation section, the controlled freeze zone constructed and arranged to form a solid from the feed stream, the controlled freeze zone section including
      a spray assembly in an upper section of the controlled freeze zone, and
      a melt tray assembly in a lower section of the controlled freeze zone, wherein the melt tray assembly includes
         at least one vapor stream riser that directs the vapor from the distillation section into liquid retained by the melt tray assembly, and
         one or more draw-off openings positioned to permit a portion of the liquid retained by the melt tray assembly to exit the controlled freeze zone section;
   a heat exchanger arranged to heat the portion of the liquid through indirect heat exchange with a heating fluid; and
   one or more return inlets that return the portion of the liquid to the melt tray assembly after the portion of the liquid has been heated in the heat exchanger.
2. The cryogenic distillation tower of claim 1, wherein the heating fluid is the feed stream prior to the feed stream being directed into the distillation tower.
3. The cryogenic distillation tower of claim 1 or claim 2, wherein the heat exchanger is a first heat exchanger and the heating fluid is a first heating fluid, and further comprising a second heat exchanger arranged to heat the portion of the liquid through indirect heat exchange with a second heating fluid.
4. The cryogenic distillation tower of paragraph 3, wherein the second heating fluid comprises one or more of ethane and propane.
5. The cryogenic distillation tower of any one of paragraphs 1-4, further comprising a pump for pumping the portion of the liquid exiting the one or more draw-off openings.
6. The cryogenic distillation tower of any one of paragraphs 1-5, further comprising a bypass line configured to selectively permit the feed stream to bypass the heat exchanger.
7. The cryogenic distillation tower of any one of paragraphs 1-6, wherein the one or more return inlets comprise two or more return inlets that are evenly distributed about a perimeter of the cryogenic distillation tower.
8. The cryogenic distillation tower of any one of paragraphs 1-7, wherein the melt tray assembly includes a heating element to heat the liquid retained in the melt tray assembly.
9. The cryogenic distillation tower of any one of paragraphs 1-8, wherein the feed gas comprises less than 30 mol % carbon dioxide.
10. The cryogenic distillation tower of any one of paragraphs 1-9, wherein the solid comprises carbon dioxide.
11. A method of cryogenically separating contaminants from a feed stream in a distillation tower, the method comprising:
   directing the feed stream into the distillation tower;
   permitting vapor to rise upwardly from a distillation section of the distillation tower;
   forming a solid in a controlled freeze zone section of the distillation tower, the controlled freeze zone section being situated above the distillation section, wherein the solid comprises contaminants in the feed stream;
   directing the vapor from the distillation section into liquid retained by a melt tray assembly using at least one vapor stream riser;
   melting the solid using the liquid retained by the melt tray assembly;
   permitting a portion of the liquid retained by the melt tray assembly to exit the controlled freeze zone section;
   heating the portion of the liquid through indirect heat exchange with a heating fluid in a heat exchanger; and
   returning the portion of the liquid to the melt tray assembly after the liquid has been heated in the heat exchanger.
12. The cryogenic distillation tower of paragraph 11, wherein the heating fluid is the feed stream prior to the feed stream being directed into the distillation tower.
13. The method of paragraph 11 or paragraph 12, wherein the heat exchanger is a first heat exchanger and the heating fluid is a first heating fluid, and further comprising:
   heating the portion of the liquid through indirect heat exchange with a second heating fluid in a second heat exchanger.
14. The method of paragraph 13, wherein the second heating fluid comprises one or more of ethane and propane.
15. The method of any one of paragraphs 11-14, further comprising:
   pumping the portion of the liquid exiting the one or more draw-off openings.
16. The method of any one of paragraphs 11-15, further comprising:
   selectively permitting the feed stream to bypass the heat exchanger.
17. The method of any one of paragraphs 11-16, wherein the one or more return inlets comprise two or more return inlets that are evenly distributed about a perimeter of the tower.
18. The method of any one of paragraphs 11-17, further comprising: heating the liquid retained in the melt tray assembly using a heating element.
19. The method of any one of paragraphs 11-18, wherein the feed gas comprises less than 30 mol % carbon dioxide.
20. The method of any one of paragraphs 11-19, wherein the solid comprises carbon dioxide.

It should be understood that numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

What is claimed is:

1. A cryogenic distillation tower for separating a feed stream, the distillation tower comprising:
   a distillation section permitting vapor to rise upwardly therefrom;
   one or more lines for directing the feed stream into the distillation tower;
   a controlled freeze zone section situated above the distillation section, the controlled freeze zone constructed and arranged to form a solid from the feed stream, the controlled freeze zone section including
      a spray assembly in an upper section of the controlled freeze zone, and
      a melt tray assembly in a lower section of the controlled freeze zone, wherein the melt tray assembly includes
         at least one vapor stream riser that directs the vapor from the distillation section into liquid retained by the melt tray assembly, and
         one or more draw-off openings positioned to permit a portion of the liquid retained by the melt tray assembly to exit the controlled freeze zone section;
   a heat exchanger arranged to heat the portion of the liquid through indirect heat exchange with a heating fluid; and
   one or more return inlets that return the portion of the liquid to the melt tray assembly after the portion of the liquid has been heated in the heat exchanger.

2. The cryogenic distillation tower of claim 1, wherein the heating fluid is the feed stream prior to the feed stream being directed into the distillation tower.

3. The cryogenic distillation tower of claim 2, further comprising a bypass line configured to selectively permit the feed stream to bypass the heat exchanger.

4. The cryogenic distillation tower of claim 1, wherein the heat exchanger is a first heat exchanger and the heating fluid is a first heating fluid, and further comprising a second heat exchanger arranged to heat the portion of the liquid through indirect heat exchange with a second heating fluid.

5. The cryogenic distillation tower of claim 4, wherein the second heating fluid comprises one or more of ethane and propane.

6. The cryogenic distillation tower of claim 1, further comprising a pump for pumping the portion of the liquid exiting the one or more draw-off openings.

7. The cryogenic distillation tower of claim 1, wherein the one or more return inlets comprise two or more return inlets that are evenly distributed about a perimeter of the cryogenic distillation tower.

8. The cryogenic distillation tower of claim 1, wherein the melt tray assembly includes a heating element to heat the liquid retained in the melt tray assembly.

9. A method of cryogenically separating contaminants from a feed stream in a distillation tower, the method comprising:
   directing the feed stream into the distillation tower;
   permitting vapor to rise upwardly from a distillation section of the distillation tower;
   forming a solid in a controlled freeze zone section of the distillation tower, the controlled freeze zone section being situated above the distillation section, wherein the solid comprises contaminants in the feed stream;
   directing the vapor from the distillation section into liquid retained by a melt tray assembly using at least one vapor stream riser;
   melting the solid using the liquid retained by the melt tray assembly;
   permitting a portion of the liquid retained by the melt tray assembly to exit the controlled freeze zone section;
   heating the portion of the liquid through indirect heat exchange with a heating fluid in a heat exchanger; and
   returning the portion of the liquid to the melt tray assembly after the liquid has been heated in the heat exchanger.

10. The method of claim 9, wherein the heating fluid is the feed stream prior to the feed stream being directed into the distillation tower.

11. The method of claim 10, further comprising: selectively permitting the feed stream to bypass the heat exchanger.

12. The method of claim 9, wherein the heat exchanger is a first heat exchanger and the heating fluid is a first heating fluid, and further comprising:
   heating the portion of the liquid through indirect heat exchange with a second heating fluid in a second heat exchanger.

13. The method of claim 12, wherein the second heating fluid comprises one or more of ethane and propane.

14. The method of claim 9, further comprising:
   pumping the portion of the liquid exiting the one or more draw-off openings.

15. The method of claim 9, wherein the one or more return inlets comprise two or more return inlets that are evenly distributed about a perimeter of the tower.

16. The method of claim 9, further comprising: heating the liquid retained in the melt tray assembly using a heating element.

17. The method of claim 9, wherein the feed gas comprises less than 30 mol % carbon dioxide.

18. The method of claim 9, wherein the solid comprises carbon dioxide.

* * * * *